United States Patent
Hlavac et al.

(10) Patent No.: US 10,740,388 B2
(45) Date of Patent: Aug. 11, 2020

(54) LINKED CAPTURE SESSION FOR AUTOMATIC IMAGE SHARING

(71) Applicant: Microsoft Technology Licensing, LLC, Redmond, WA (US)

(72) Inventors: Michal Hlavac, Seattle, WA (US); Mark A. DeFalco, Bellevue, WA (US); Mark Davis Schwesinger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 15/414,285

(22) Filed: Jan. 24, 2017

(65) Prior Publication Data
US 2018/0213175 A1    Jul. 26, 2018

(51) Int. Cl.
*G06F 16/58* (2019.01)
*H04N 5/232* (2006.01)
*H04N 1/00* (2006.01)
*H04N 1/21* (2006.01)
*H04L 29/06* (2006.01)

(52) U.S. Cl.
CPC ...... *G06F 16/5866* (2019.01); *H04L 65/1069* (2013.01); *H04N 1/00095* (2013.01); *H04N 1/00156* (2013.01); *H04N 1/00244* (2013.01); *H04N 1/2183* (2013.01); *H04N 1/2187* (2013.01); *H04N 1/2191* (2013.01); *H04N 5/232* (2013.01); *H04N 2201/0084* (2013.01)

(58) Field of Classification Search
None
See application file for complete search history.

(56) References Cited

U.S. PATENT DOCUMENTS

| 7,809,192 B2 | 10/2010 | Gokturk et al. |
| 8,204,437 B1 | 6/2012 | Rothschild |
| 8,270,684 B2 | 9/2012 | Kiyohara et al. |
| 8,447,769 B1 | 5/2013 | Paris et al. |

(Continued)

FOREIGN PATENT DOCUMENTS

| CN | 101534318 | 9/2009 |
| CN | 101641948 | 2/2010 |

(Continued)

OTHER PUBLICATIONS

"Final Office Action", U.S. Appl. No. 13/455,797, dated Aug. 29, 2014, 13 pages.

(Continued)

*Primary Examiner* — Cynthia Segura
(74) *Attorney, Agent, or Firm* — Alleman Hall Creasman & Tuttle LLP

(57) ABSTRACT

A computing device initiates a linked capture session to enable automatic image sharing by multiple users and devices. The linked capture session is a group of devices that automatically share captured images during the linked capture session. The linked capture session may be initiated based on a location, a group of people, and/or a time duration. The images captured by devices that are connected in the linked capture session are automatically communicated to a remote storage system that allows all users to access the images through devices connected to the linked capture session.

12 Claims, 6 Drawing Sheets

(56) References Cited

U.S. PATENT DOCUMENTS

| | | | |
|---|---|---|---|
| 8,477,227 B2* | 7/2013 | Hio | H04N 5/23203 348/143 |
| 8,918,463 B2 | 12/2014 | Garcia et al. | |
| 8,947,547 B1* | 2/2015 | Millikan | H04N 1/00156 348/211.1 |
| 9,009,126 B2* | 4/2015 | Spivack | H04L 51/32 707/705 |
| 9,143,601 B2 | 9/2015 | Padmanabhan et al. | |
| 9,152,849 B2 | 10/2015 | Ganong et al. | |
| 9,179,021 B2 | 11/2015 | Latta et al. | |
| 9,241,018 B2 | 1/2016 | Johnson et al. | |
| 9,332,289 B2* | 5/2016 | Yoneda | H04N 21/25816 |
| 9,342,817 B2 | 5/2016 | Elliott | |
| 9,355,387 B1 | 5/2016 | Dixon et al. | |
| 9,405,774 B2 | 8/2016 | Charania et al. | |
| 9,542,422 B2* | 1/2017 | Duggal | G06F 16/51 |
| 9,712,733 B2* | 7/2017 | Cao | H04N 5/232 |
| 10,523,839 B2* | 12/2019 | Millikan | H04N 1/00156 |
| 2003/0236832 A1* | 12/2003 | McIntyre | H04L 29/06 709/204 |
| 2004/0263631 A1* | 12/2004 | Brittan | H04M 1/72555 348/207.1 |
| 2006/0171695 A1 | 8/2006 | Jung et al. | |
| 2007/0188621 A1* | 8/2007 | Kitagawa | H04N 1/00127 348/211.99 |
| 2007/0255807 A1 | 11/2007 | Hayashi et al. | |
| 2008/0106621 A1 | 5/2008 | Jung et al. | |
| 2008/0120369 A1* | 5/2008 | Gustavsson | H04L 67/1095 709/204 |
| 2009/0254614 A1 | 10/2009 | Brush et al. | |
| 2009/0261944 A1* | 10/2009 | Fukuta | G06F 17/30035 340/5.8 |
| 2010/0020186 A1* | 1/2010 | Matsui | H04N 1/00249 348/211.2 |
| 2010/0293198 A1 | 11/2010 | Marinucci et al. | |
| 2010/0311347 A1* | 12/2010 | Le Thierry D'Ennequin | H04N 1/32106 455/67.11 |
| 2011/0069179 A1* | 3/2011 | Bathiche | H04N 5/23206 348/207.1 |
| 2011/0161423 A1 | 6/2011 | Pratt et al. | |
| 2011/0309946 A1* | 12/2011 | Jonsson | H04M 1/72563 340/686.6 |
| 2012/0011197 A1 | 1/2012 | Arisawa et al. | |
| 2012/0033026 A1* | 2/2012 | Murphy | H04N 7/147 348/14.01 |
| 2012/0093355 A1 | 4/2012 | Levien et al. | |
| 2012/0133638 A1* | 5/2012 | Davison | G06T 17/00 345/419 |
| 2012/0140083 A1 | 6/2012 | Schultz et al. | |
| 2012/0268611 A1* | 10/2012 | Kimijima | H04N 1/00137 348/207.1 |
| 2013/0027569 A1* | 1/2013 | Parulski | H04N 5/232 348/207.1 |
| 2013/0194438 A1 | 8/2013 | Sweet, III et al. | |
| 2013/0206832 A1* | 8/2013 | Hashimoto | G06F 17/30244 235/375 |
| 2013/0235215 A1* | 9/2013 | Okada | H04N 5/77 348/207.1 |
| 2013/0286223 A1* | 10/2013 | Latta | H04N 1/00137 348/207.1 |
| 2014/0040281 A1* | 2/2014 | Spivack | G06F 17/3053 707/748 |
| 2014/0189726 A1* | 7/2014 | Yoneda | H04N 21/25816 725/25 |
| 2014/0285313 A1* | 9/2014 | Luna | H04R 3/00 340/4.42 |
| 2014/0368601 A1* | 12/2014 | deCharms | H04W 4/021 348/14.02 |
| 2015/0006637 A1 | 1/2015 | Kangas et al. | |
| 2015/0065172 A1 | 3/2015 | Do et al. | |
| 2015/0101064 A1* | 4/2015 | Taki | H04N 1/00281 726/28 |
| 2015/0170039 A1* | 6/2015 | Hostyn | H04N 1/00204 348/207.1 |
| 2015/0172238 A1* | 6/2015 | Ahmed | H04L 51/08 709/217 |
| 2015/0356121 A1 | 12/2015 | Schmelzer | |
| 2016/0011758 A1* | 1/2016 | Dornbush | H04N 5/772 348/14.03 |
| 2017/0048592 A1* | 2/2017 | Branch | H04W 4/02 |
| 2017/0070705 A1* | 3/2017 | Kumar | H04N 7/155 |
| 2017/0085775 A1* | 3/2017 | Ito | G03B 17/38 |
| 2017/0295210 A1* | 10/2017 | Choi | H04L 51/04 |
| 2018/0102999 A1* | 4/2018 | Keysers | G06Q 10/00 |
| 2018/0204097 A1* | 7/2018 | Karki | G06T 7/97 |
| 2019/0020696 A1* | 1/2019 | Winawer | H04L 69/28 |

FOREIGN PATENT DOCUMENTS

| | | |
|---|---|---|
| CN | 102045233 | 5/2011 |
| CN | 103365957 | 10/2013 |
| WO | WO-2013162976 | 10/2013 |

OTHER PUBLICATIONS

"Final Office Action", U.S. Appl. No. 13/455,797, dated Dec. 20, 2013, 11 pages.

"Foreign Office Action", CN Application No. 201310145463.2, dated Jul. 7, 2016, 6 pages.

"Foreign Office Action", CN Application No. 201310145463.2, dated Nov. 25, 2015, 13 pages.

"International Preliminary Report on Patentability", Application No. PCT/US2013/037042, dated Oct. 28, 2014, 5 pages.

"International Search Report and Written Opinion", Application No. PCT/US2013/037042, dated Jun. 20, 2013, 8 pages.

"iPhoto'11", retrieved from <http://www.apple.com/ilife/iphoto/what-is.html> on Oct. 27, 2011, 6 pages.

"Non-Final Office Action", U.S. Appl. No. 13/455,797, dated Jan. 9, 2015, 13 pages.

"Non-Final Office Action", U.S. Appl. No. 13/455,797, dated May 19, 2014, 14 pages.

"Non-Final Office Action", U.S. Appl. No. 13/455,797, dated Jun. 21, 2013, 11 pages.

"Notice of Allowance", U.S. Appl. No. 13/455,797, dated Jun. 29, 2015, 9 pages.

"Share Pictures and Videos", Windows Phone—retrieved from <http://www.microsoft.com/windowsphone/en-us/howto/wp7/pictures/upload-pictures-to-the-web.aspx> on Oct. 27, 2011, retrieved from <http://www.microsoft.com/windowsphone/en-us/howto/wp7/pictures/upload-pictures-to-the-web.aspx> on Oct. 27, 2011, 3 pages.

Davis,"MMM2: Mobile Media Metadata for Media Sharing", Extended Abstracts of the Conference on Human Factors in Computing Systems, available at <http://citeseer.ist.psu.edu/viewdoc/download;jsessionid=7C432C20D851B1D05019C905D2580D65?doi=10.1.1.83.3035&rep=rep1&type=pdf>, 2005, 4 pages.

Vazquez-Fernandez,"Built-In Face Recognition for Smart Photo Sharing in Mobile Devices", 2011 IEEE International Conference on Multimedia and Expo (ICME), available at <http://ieeexplore.ieee.org/stamp/stamp.jsp?tp=&arnumber=6012057>, Jul. 11, 2011, 4 pages.

"iCloud Photo Library", Published on: Jan. 3, 2016 Available at: http://www.apple.com/in/icloud/photos/.

* cited by examiner

LINKED CAPTURE SESSION FOR AUTOMATIC IMAGE SHARING

BACKGROUND

Image capture devices are now ubiquitous, and more images of important and interesting occasions are captured than ever before. Everyone, however, has been at a major event—an anniversary party or a family reunion—where someone captures a perfect image of a moment, and is then inundated with requests to share the image. Often, no one ever gets that image. Similarly, if one person's phone battery dies, that person then has to spend the rest of the event trying to collect images from the guests, probably with limited success, rather than enjoying the event. These problems can lead to user frustration with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more embodiments, a linked capture session is initiated to enable automatic image sharing by multiple users and devices. The linked capture session is a group of devices that automatically share captured images during the linked capture session. The linked capture session may be initiated based on a location, a group of people, and/or a time duration and, once initiated, the images captured by devices that are connected in the linked capture session are automatically communicated to a remote storage system that allows all users to access the images through devices connected to the linked capture session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A linked capture session for automatic image sharing is discussed herein. A linked capture session is initiated to connect multiple computing devices. Images captured by the devices that are connected in the linked capture session are automatically communicated to a remote storage system that stores the images. The linked capture session enables the devices connected in the linked capture session to access, edit, download, and so forth images stored by the remote storage system. The linked capture session can be defined by one or more of a time duration, an event, and a group of users.

Devices may be invited to join the linked capture session based on a user's online presence. Additionally or alternatively, the linked capture session may be automatically initiated based on device proximity (to each other or to an event), camera activity, and/or detection of particular persons in an image. Once the linked capture session is initiated, each user has access (through a connected device) to content captured during the linked capture session. The content may also be displayed (e.g., as a slideshow) on a television or any other screen that can be connected to the linked capture session.

The techniques discussed herein allow users to automatically share images in a specified and defined manner, in real time as the images are captured. This reduces the difficulty of capturing and sharing quality images at large or small events, regardless of the number of attendees capturing images or whether the users know each other. Rather than competing with everyone else to capture the same images, and then trying to find everyone that captured desirable images to ask them to share, the linked capture session allows images and videos to be shared automatically and in real time. Merely being at the event (and being connected to the linked capture session) provides access to all of the images and videos from the event. The linked capture session allows users to change their behavior from competition (e.g., fighting to capture images from the best location, getting access to images) to collaboration (e.g., capturing different interesting and complimentary images). Users can even choose not to worry about capturing any images themselves, and just enjoy the event, knowing that others are capturing the moments and that they will be shared via the linked capture session.

In contrast to applications and programs that help users simplify sharing captured images by treating sharing as an action that happens after the image has been captured or even after the end of the event at which the image was captured, the techniques discussed herein allow linked capture sessions to be established before an image is captured. This alleviates the situation in which, because the event is over and the image is already stored on their device, people become engaged with their life and busy with work and fail to share the images.

Figure 1:
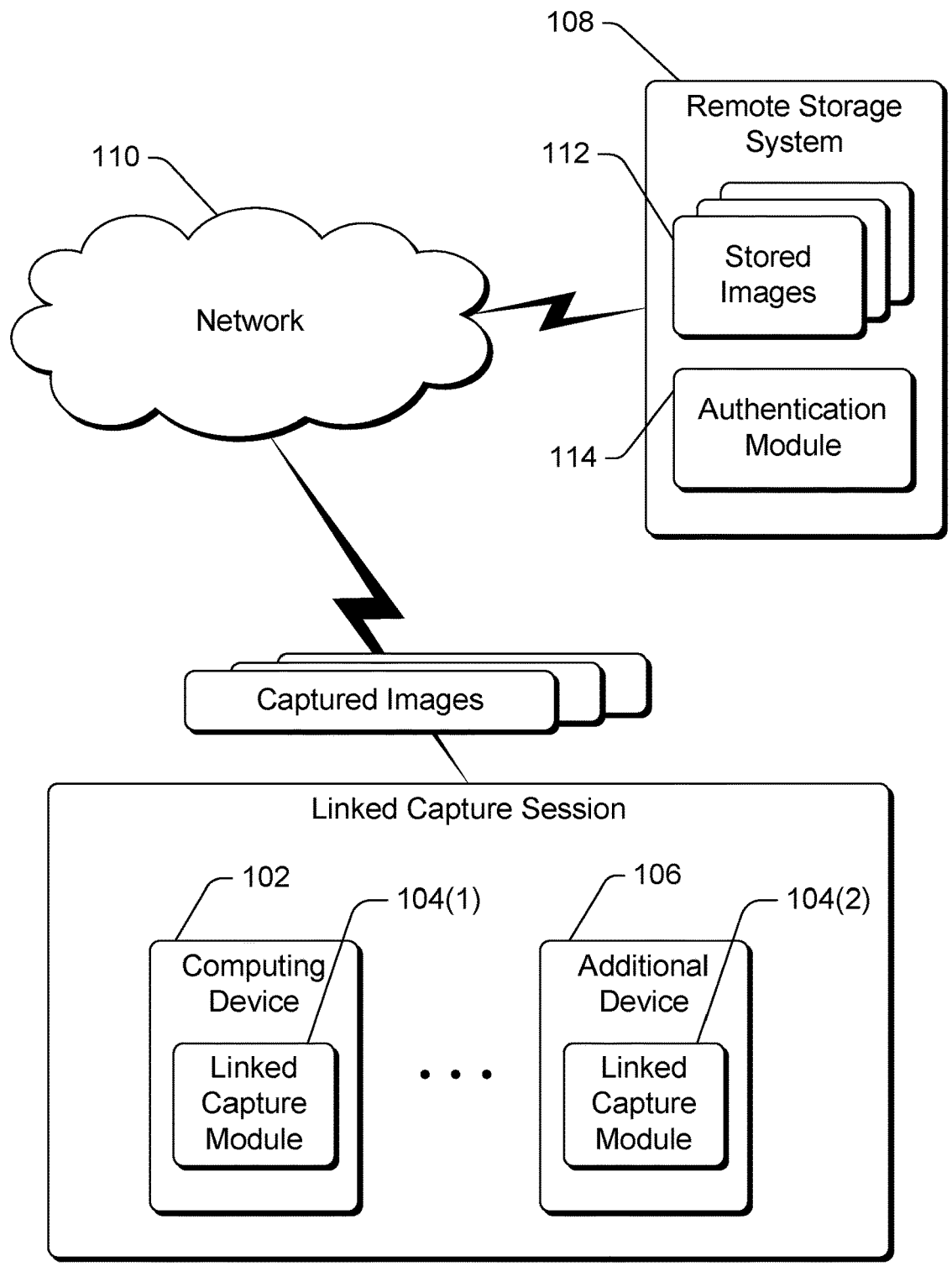
FIG. 1 is a block diagram illustrating an example system implementing the linked capture session for automatic image sharing in accordance with one or more embodiments.

FIG. 1 illustrates an example system 100 implementing the linked capture session for automatic image sharing in accordance with one or more embodiments. The system 100 includes a computing device 102, which can be a variety of different types of devices, such as a dedicated image capture device (e.g., a digital camera), a desktop computer, a laptop or netbook computer, a mobile device (e.g., a tablet or phablet device, a cellular or other wireless phone (e.g., a smartphone), a notepad computer, a mobile station), and so forth. Additionally or alternatively, the computing device 102 can be a variety of other types of computing devices, such as a server computer, a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 102 may range from full resource devices with substantial memory and processor resources (e.g., personal computers, game consoles) to low-resource devices with limited memory and/or processing resources (e.g., traditional set-top boxes, hand-held game consoles).

The computing device 102 includes a linked capture module 104(1), which can be used to initiate a linked capture session between the computing device 102 and an additional device 106 that also includes a linked capture module 104(2). In one or more embodiments, the linked capture modules 104 (shown as 104(1) and 104(2)) implement the same functionality, although are implemented in two different devices. Analogous to the discussion of the computing device 102, the additional device 106 can be a variety of different devices, ranging from full resource devices with substantial memory and processor resources to a low-resource device with limited memory and/or processing resources. Although particular functionality is discussed herein with reference to the linked capture modules 104, it should be noted that the functionality of a linked capture module 104 can be separated into multiple modules that are included with the computing device 102, the additional device 106, and/or other locations that are associated with the example system 100.

The linked capture session is a connected image sharing session that enables the computing device 102 and the additional device 106 to automatically share captured images via a remote storage system 108. Access to the remote storage system 108 can be enabled via a network 110. The network 110 can be a variety of different networks, such as the Internet, a local area network (LAN), a public telephone network, an intranet, other public and/or proprietary networks, combinations thereof, and so forth. Although some discussions refer to the computing device 102 and the additional device 106, it should be noted that a linked capture session can include any number of devices.

The linked capture session can be defined in a variety of ways. For example, the linked capture session may be defined by a preselected time duration, an event (e.g. a sporting event, a music festival, a wedding reception, and so forth), and/or a group of users (e.g., invitees to the linked capture session, members of a club, and so forth). Once the linked capture session is initiated, the computing device 102 and/or the additional device 106 can be used to capture images, and the linked capture module 104(1) and/or 104(2) automatically communicates the captured images to the remote storage system 108 via network 110. The remote storage system 108 then stores the captured images as stored images 112. The linked capture modules 104 can receive any of the stored images 112 from the remote storage system 108 and display them (e.g., on a display of the computing device 102 and/or the additional device 106).

A linked capture module 104 can initiate the linked capture session in a variety of ways. For example, the linked capture module 104(1) can initiate the linked capture session by inviting the additional device 106 to join the linked capture session. The linked capture module 104(1) can invite the additional device 106 to join the linked capture session by displaying or otherwise providing a bar code (e.g., a quick response (QR) code) associated with the linked capture session, providing a link to join the linked capture session via a social media service, providing a link (e.g., a uniform resource locator (URL)) that allows the additional device 106 to join a particular linked capture session via a web browser, and so forth.

The linked capture modules 104 are also used to end the linked capture session by unlinking the computing device 102 and the additional device 106 from the linked capture session such that captured images are not automatically communicated to the remote storage system 108. For example, the linked capture module 104(1) may unlink the computing device 102 and the linked capture module 104(2) may unlink the additional device 106 from the linked capture session when the preselected time duration expires, when the event associated with the linked capture session ends, and so forth. In scenarios where the linked capture session is defined by a group of users, the linked capture modules 104 may end the linked capture session in a number of different manners. For example, a linked capture module 104 may have access to the group membership list and unlink members whose identity is removed from the list.

In one or more embodiments, the remote storage system 108 also includes an authentication module 114 that can be used to further control access to the linked capture session by verifying that the linked capture session is comprised only of devices that the initiating device (e.g., the computing device 102) included in the linked capture session initiation. Any of a variety of public and/or proprietary authentication algorithms can be used to perform the authentication. For example, in situations in which the linked capture module 104(1) has provided an invitation for the additional device 106 to join the linked capture session via a social media service, the authentication module verifies that the additional device 106 is actually the device that has been invited. The verification can be performed by ensuring that the social media service is accessed using the appropriate credentials associated with the additional device 106 or an entity represented by the additional device 106 (e.g., a user name and password, a digital key or password, biometric information, and so forth).

The authentication module 114 can also provide identification of the different devices joined to the linked capture session, so that the remote storage system 108 can distinguish the captured images communicated from the devices in the linked capture session (i.e., which images were communicated from which device). Although particular functionality is discussed herein with reference to the authentication module 114, it should be noted that the functionality of the authentication module 114 can be separated into multiple modules that are included with the remote storage system 108 and/or with another location associated with example system 100.

Generally, devices that have been linked to the linked capture session and authenticated by the authentication module 114 have access to view, download, edit, and/or delete the stored images 112. Optionally, the authentication module 114 can be used to control the type of access any particular device may exercise. For example, the authentication module 114 may be used to restrict the ability to delete images from the stored images 112 such that images can be deleted only by the device that communicated the image to the remote storage system 108. Additionally or alternatively, the authentication module 114 may allow users to delete any image in which the user appears (e.g., by using facial recognition techniques, social media profile, and so forth).

In embodiments, the remote storage system 108 can be used to provide a common timestamp for the stored images 112 by determining the timestamps for captured images communicated from the computing device 102 and/or the additional device 106 and synchronizing the timestamps to create the common timestamp. The synchronization can be achieved by a variety of processes. For example, the remote storage system 108 may use an internal clock to assign timestamps to the stored images 112 when they are communicated to the remote storage system 108. In another example, the remote storage system 108 may compare the determined timestamps for images simultaneously communicated from different devices (e.g. computing device 102 and additional device 106) and use a correction factor (e.g. a difference between the timestamps, a difference between the timestamps and a reference timestamp, and so forth) to adjust either or both timestamps to create the common timestamp. By way of another example, the remote storage system 108 may communicate date and time information to the computing device 102 and the additional device 106, allowing the linked capture modules 104 (or other modules) to set the data and time information so that all devices that are part of a linked capture session are synchronized to the same date and time.

The common timestamp can be used by the linked capture modules 104 and/or the remote storage system 108 to create customized image presentations. For example, the linked capture modules 104 can receive multiple different images of the same subject matter (e.g., from different angles, with different resolution, and so forth), all having the same common timestamp, and create a three-dimensional image of the subject matter using the different images. The common timestamp can also be used to create a chronological slide show from the stored images 112. The linked capture modules 104 can receive sequential images of particular subject matter from the remote storage system 108 and create a chronological slide show that depicts the subject matter over time. Each linked capture module 104 can create the three-dimensional image or the chronological slide show using any of a variety of public and/or proprietary techniques.

Additionally or alternatively, the chronological slide show can be presented on a display device in real time, as images are communicated to the remote storage system 108. For example, the remote storage system 108 can create the chronological slide show from all the images communicated from the devices joined in the linked capture session and communicate the images, as they are received, to one or more display devices joined in the linked capture session. In this way, a chronological slide show comprised of all the images being captured in the linked capture session can be presented, in real time, on a common display (e.g., a large screen display in a reception hall) and/or on individual displays of devices joined to the linked capture session.

The remote storage system 108 can also be used to filter the stored images 112. The filtering can be performed in a variety of ways. For example, the remote storage system 108 can rank the stored images 112 images based on a contact list that it receives from a device joined in the linked capture session (e.g., the computing device 102 and/or the additional device 106). The remote storage system 108 uses the contact list to rank the images so that images captured by devices associated with the most frequently contacted members of the contact list appear first. In another example, the remote storage system 108 is configured to allow users of devices joined in the linked capture session to vote on particular images (e.g., "likes", upvotes, downvotes, and so forth) and/or download images. The remote storage system 108 can then filter the stored images 112 based on a number of downloads, a number of upvotes or likes received, and so forth. The stored images 112 can then be ranked so that the images with the more downloads or upvotes are presented before images with fewer downloads or upvotes. Optionally, the remote storage system 108 can adjust the number of votes by subtracting downvotes or other negative votes.

In another example, the remote storage system 108 can determine the number of likes and/or upvotes received by images communicated from a particular photographer. The positive votes (likes and/or upvotes) associated with images communicated to the remote storage system 108 from the photographer are used to create a credential for the photographer (e.g. by counting the positive votes). The credential can be used as a filtering criterion so that, once a photographer has established a credential (e.g. a threshold number of positive votes, a threshold ratio of positive votes to negative votes, and so forth), the remote storage system 108 can filter images based on the credential. The remote storage system 108 can then rank the stored images 112 based on the credential of the photographer so that the images communicated by the photographer with the best credential (e.g., the most positive votes, the fewest negative votes, and so forth) are presented first.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 2:
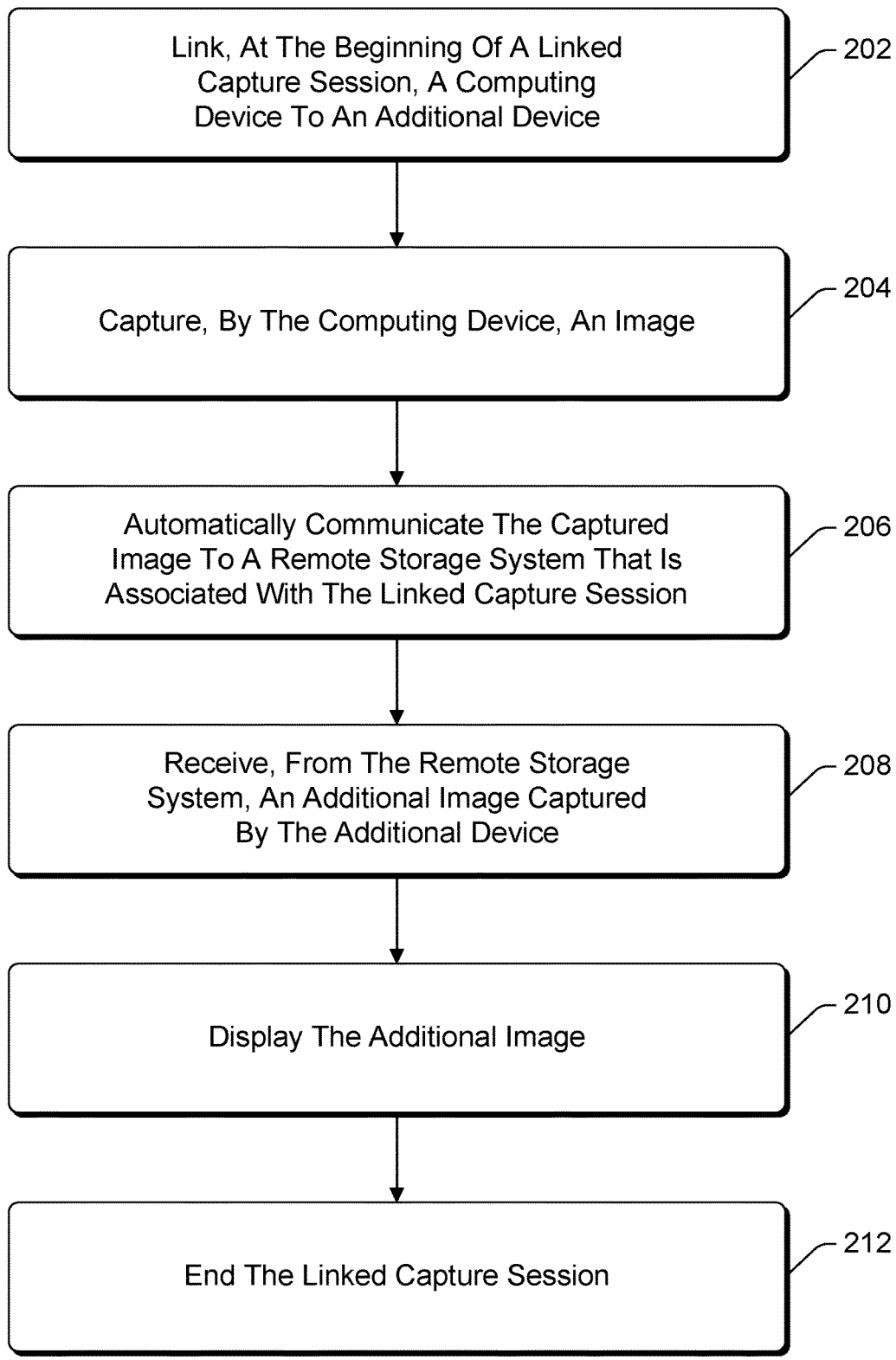
FIG. 2 is a flowchart illustrating an example process for implementing a linked capture session for automatic image sharing in accordance with one or more embodiments.

FIG. 2 is a flowchart illustrating an example process 200 for implementing a linked capture session for automatic image sharing in accordance with one or more embodiments. The process 200 is carried out by a device, such as the computing device 102 of FIG. 1, and can be implemented in software, firmware, hardware, or combinations thereof. Process 200 is shown as a set of acts and is not limited to the order shown for performing the operations of the various acts. Process 200 is an example process for implementing the linked capture session for automatic image sharing; additional discussions of implementing the linked capture session are included herein with reference to different figures.

In process 200, a computing device is linked to an additional device at the beginning of a linked capture session (act 202). The link can be initiated by the computing device inviting the additional device to join the linked capture session. The invitation can be extended to the additional device by providing a bar code (e.g., a QR code) associated with the linked capture session, providing a link to join the linked capture session via a social media service, providing a link (e.g., a URL) that allows the additional device to join the linked capture session via a web browser, and so forth. Optionally, linking the computing device and the additional device in the linked capture session may include authentication of one or both devices, as described with reference to FIG. 1.

The computing device then captures an image (act 204). The captured image can be a still image, a video, and so forth. The image optionally includes audio or annotations (e.g., text, links, and so forth).

The captured image is automatically communicated to a remote storage system that is associated with the linked capture session (act 206). The image is communicated via a network 110, as described with reference to FIG. 1, and the remote storage system stores the captured image.

The computing device then receives an additional image, captured by the additional device, from the remote storage system (act 208). As described with reference to FIG. 1, the remote storage system can be used to provide a common timestamp for images received from different devices (e.g., the computing device and/or the additional device of act 202). The common timestamp allows the stored images to be used to synchronize images in the remote storage system so that the images can be used to create three-dimensional images or chronological slide shows, as described with reference to FIG. 1.

The additional image is then displayed by the computing device (act 210). As described with reference to FIG. 1, the displayed images can be filtered before being displayed. The filtering can be based on a number criteria, including by ranking the images based on a contact list, a number of votes received, a number of downloads, a credential of a photographer, and so forth.

The linked captured session is then ended (act 212). The linked capture session can be ended by unlinking the computing device and the additional device from the linked capture session such that captured images are not automatically communicated to the remote storage system.

Figure 3:
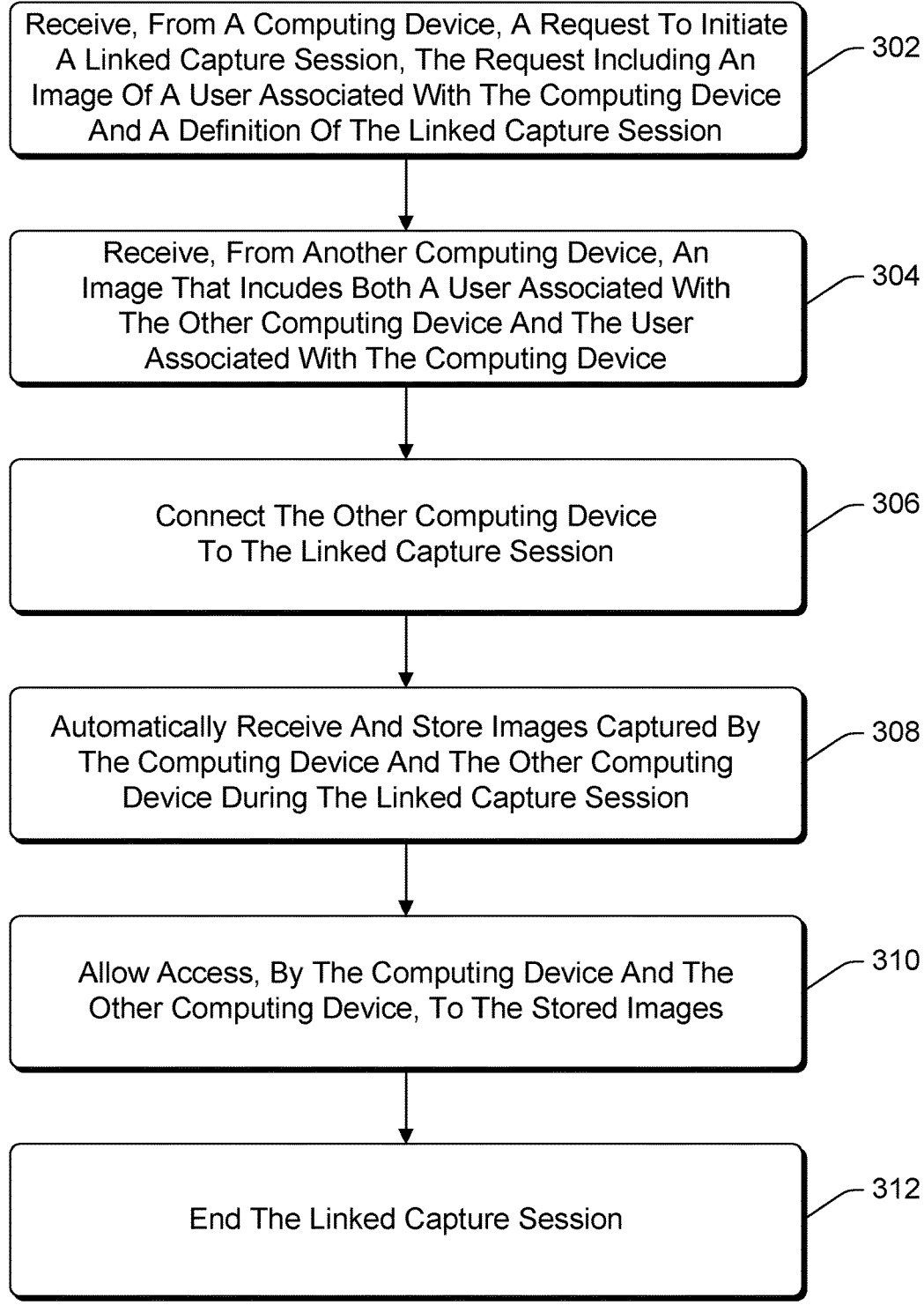
FIG. 3 is a flowchart illustrating another example process for implementing a linked capture session for automatic image sharing in accordance with one or more embodiments.

FIG. 3 is a flowchart illustrating an example process 300 for implementing a linked capture session for automatic image sharing in accordance with one or more embodiments. Acts of process 300 are carried out by a service, such as the remote storage system 108 of FIG. 1, and can be implemented in software, firmware, hardware, or combinations thereof. Process 300 is shown as a set of acts and is not limited to the order shown for performing the operations of the various acts. Process 300 is an example process for implementing the linked capture session for automatic image sharing; additional discussions of implementing the linked capture session are included herein with reference to different figures.

In process 300, a request to initiate a linked capture session is received from a computing device (act 302). The request includes an image of a user that is associated with the computing device and a definition of the linked capture session. In one or more embodiments, the definition of the linked capture session includes a time duration, an event identifier (e.g., name or globally unique identifier (GUID), a geo-coded boundary, a proximity between devices capable of participating in the linked capture session, combinations thereof, and so forth.

The linked capture session is initiated by the request and definition. The definition describes the boundaries of the linked capture session. For example, a definition that includes a time duration defines set start and stop times for the linked capture session. Similarly, a linked capture session defined by an event starts and stops with the event. The start and stop times of the event may be determined in real time or based on pre-defined criteria. The duration can thus vary with the length of the event (e.g., a weather delay or overtime at a sporting event, a speech that runs over the allotted time at a political rally, and so forth). Where the definition includes a geo-coded boundary or a proximity, the positions of the devices are known (e.g., via a GPS system, a cellular-tower location system, and so forth). The linked capture session then includes devices within the geo-coded boundary or that are within a threshold distance from each other and/or a reference point (e.g., the location of the linked capture session initiator, a stadium, and so forth).

An image is then received from another computing device that is capable of participating in the linked capture session (act 304). The image includes both a user associated with the other computing device and the user associated with the computing device (e.g., the image received from the other computing device is a "selfie" that includes the users of both devices). The users of the devices may be identified in the images via a variety of public and/or proprietary facial recognition techniques. In some embodiments, the capability to participate in the linked capture session is a functionality of the device (e.g., an application or program installed on the device). Additionally or alternatively, the capability is established by preregistration with a service that provides the linked capture session (e.g. a cloud-based service, a subscription service, and so forth).

The other computing device is then connected to the linked capture session (act 306). Connecting the other computing device to the linked capture session may be automatic upon receiving the image, or performed by using the image of the user associated with the other computing device to search for a contact method that can be used to send an invitation to the other computing device (e.g., by one or more techniques described with reference to FIG. 1). Optionally, connecting the computing device and the other computing device in the linked capture session may require authentication of one or both devices, as described with reference to FIG. 1.

Images captured by the computing device and/or the other computing device during the linked capture session are automatically received and stored (act 308). As described with reference to FIG. 1, a common timestamp for the images received from different devices (e.g., the computing device and/or the other computing device) can be determined. The common timestamp allows the stored images to be synchronized so that the images can be used to create three-dimensional models or chronological slide shows, as described with reference to FIG. 1.

The computing device and the other computing device are allowed access to the stored images (act 310). Generally, the access includes the ability to view, download, edit, and/or delete the stored images. Optionally, the type of access any particular device may exercise may be restricted, as described with respect to FIG. 1. For example, the capability to delete images may be restricted the device that captured the image, or to users that appear in the image (by using facial recognition techniques, social media profiles, and so forth).

The linked captured session is then ended (act 312). The linked capture session can be ended by unlinking the computing device and the other computing device from the linked capture session such that images captured by the computing device and/or the other computing device are not automatically received and stored.

Figure 4:
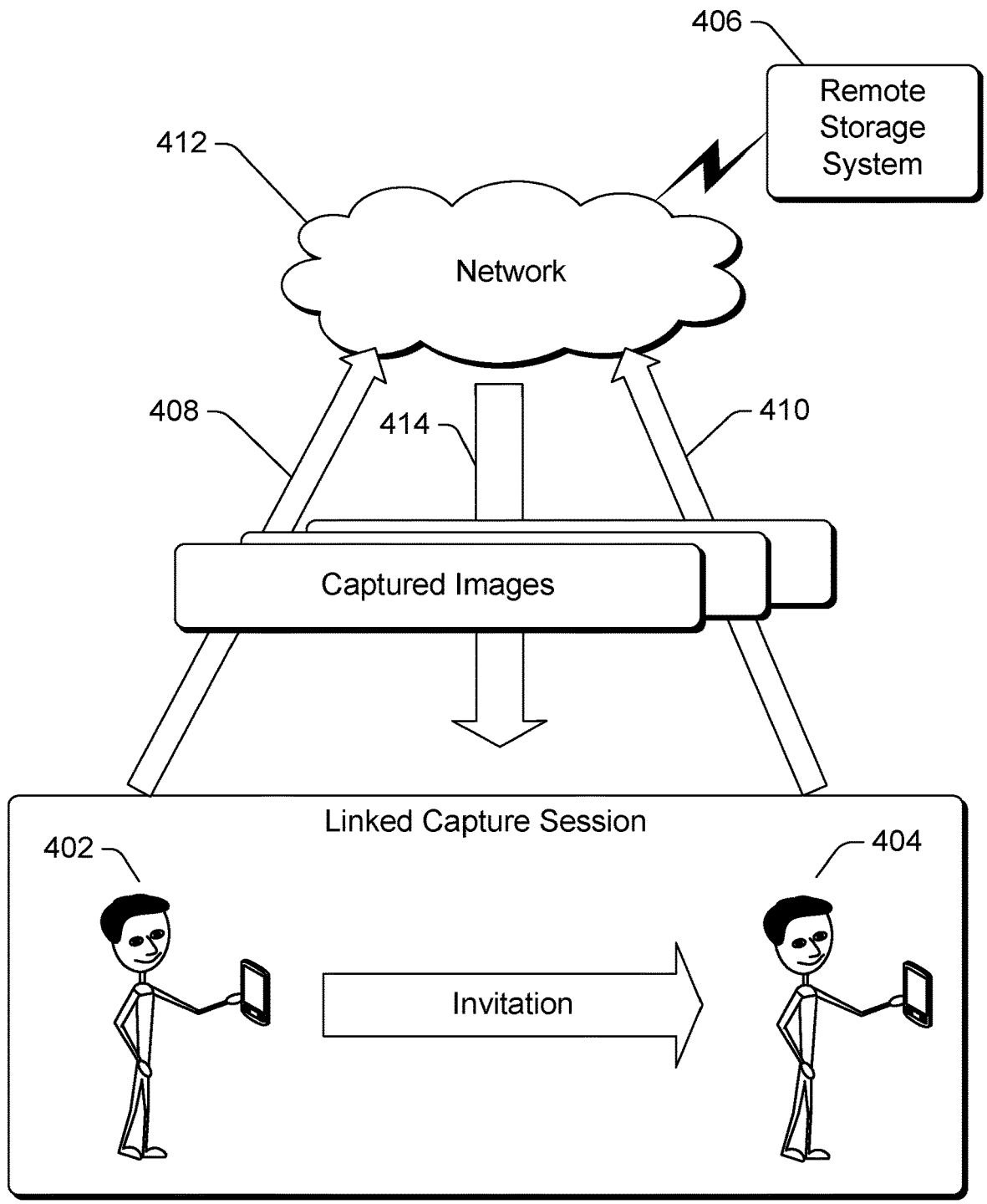
FIG. 4 illustrates an example scenario that describes aspects of the linked capture session for automatic image sharing in accordance with one or more embodiments.

FIG. 4 presents an example scenario 400 that illustrates aspects of the linked capture session for automatic image sharing, including aspects similar to the example process

200 of FIG. 2. In example scenario 400, a user 402 initiates the linked capture session by sending an invitation to another user 404. The invitation could be a bar code (e.g., a QR code) associated with the linked capture session, a link to join the linked capture session via a social media service, a link (e.g., a URL) that allows the other user to join the linked capture session via a web browser, and so forth. The users 402 and 404 then use their computing device to capture images (e.g., still images, video, and so forth). Because the users 402 and 404 are connected in the linked capture session, the captured images are automatically communicated to a remote storage system 406, as shown in FIG. 4 by arrows 408 and 410, respectively. The images are communicated via a network 412. Users 402 and 404 can both then receive and display any images that have been communicated to the remote storage system 406, as shown by arrow 414.

Figure 5:
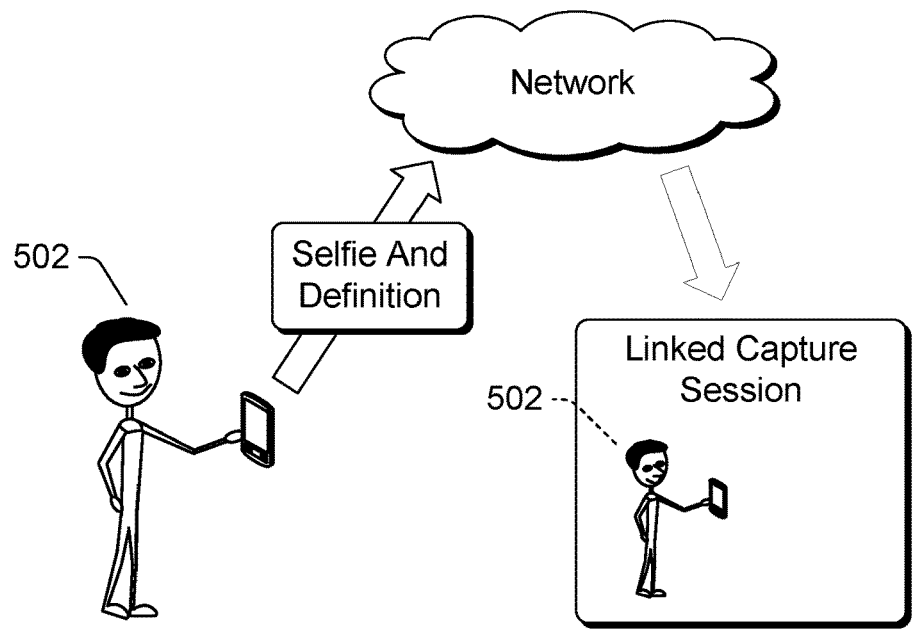
FIG. 5 illustrates another example scenario that describes aspects of the linked capture session for automatic image sharing in accordance with one or more embodiments.
Figure 5:
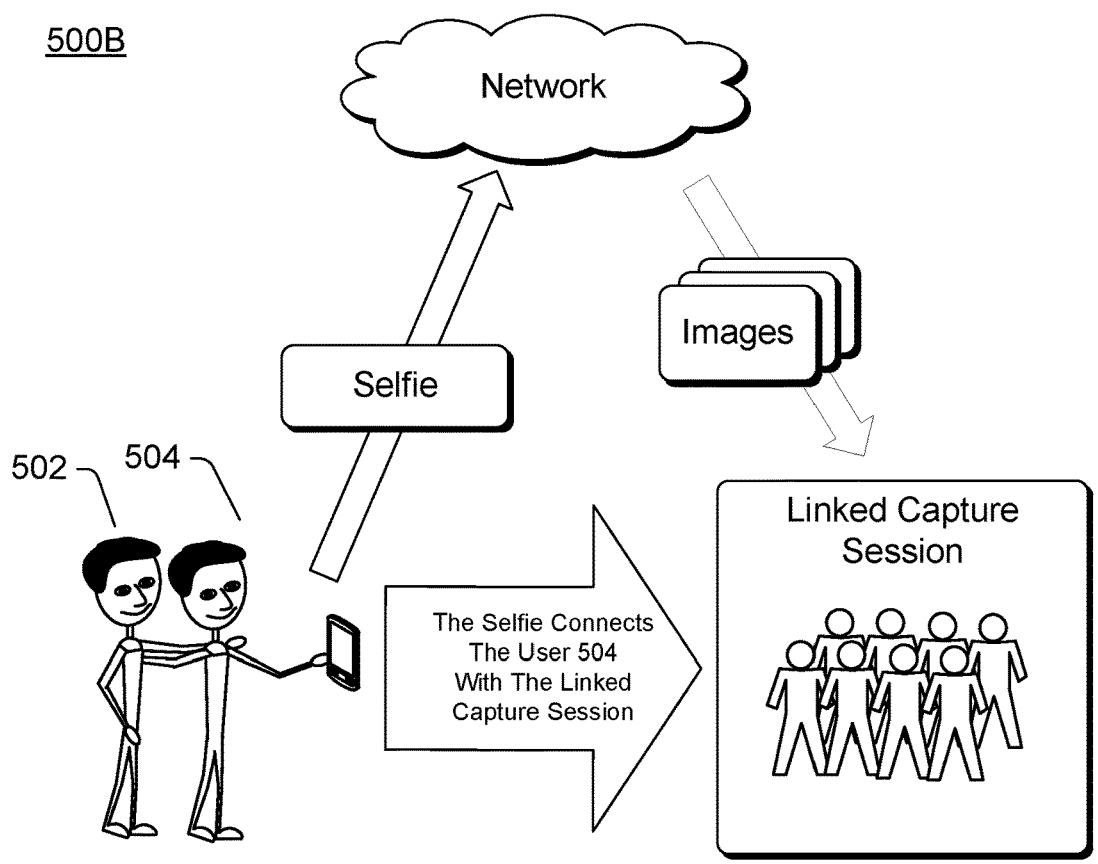

FIG. 5 presents additional example scenarios 500A and 500B that illustrate aspects of the linked capture session for automatic image sharing, including aspects similar to the example process 300 of FIG. 3. In example scenario 500A, a user 502 initiates a linked capture session with a service that supports linked capture sessions by sending an image of the user (e.g., a selfie) along with a definition of the linked capture session to the service. As described with reference to FIG. 3, the definition of the linked capture session includes at least one of a time duration, an event, a geo-coded boundary, and a proximity between devices capable of participating in the linked capture session. The linked capture session is initiated by the service upon receiving the request and definition.

In example scenario 500B, another user 504 wants to join the linked capture session with user 502. The user 504 captures an image that includes both the user 502 and the user 504 (e.g., the user 504 takes a selfie that includes the user 502). As described with reference to FIG. 3, the users 502 and 504 may be identified in the image via a variety of public and/or proprietary facial recognition techniques, and the capability to participate in the linked capture session may be enabled by a function of the user's device (e.g., an application) or by preregistration with a service that provides the linked capture session (e.g. a cloud-based service, a subscription service, and so forth). The user 504 is then connected to the linked capture session as described with reference to FIG. 3 and images captured by the user 504 during the linked capture session are automatically received and stored in the linked capture session. The users connected with the linked capture session (including the user 504) are allowed access to the stored images.

Figure 6:
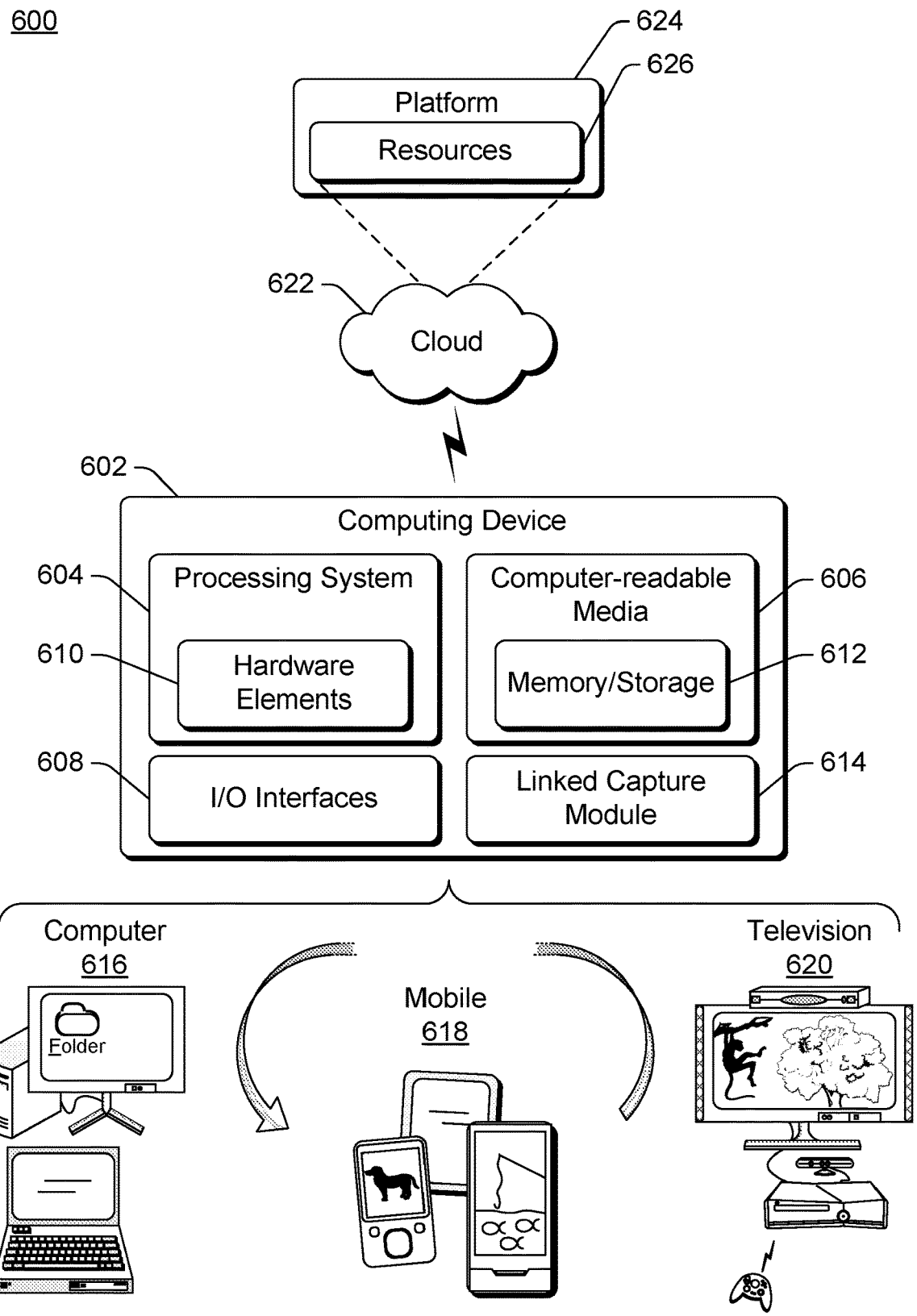
FIG. 6 illustrates an example system generally that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 includes a linked capture module 614. The linked capture module 614 provides various functionality for interacting with a linked capture session, such as for initiating a linked capture session or accessing, editing, or deleting images in an existing linked capture session. The linked capture module 614 can be, for example, the linked capture module 104(1) or 104(2) of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: linking, at the beginning of a linked capture session, a computing device to an additional device via the linked capture session; capturing, by the computing device, an image; automatically communicating the captured image to a remote storage system that is associated with the linked capture session; receiving, from the remote storage system, an additional image captured by the additional device; and displaying the additional image.

Alternatively or in addition to any of the above described methods, any one or combination of: the linking the computing device to the additional device comprising inviting the additional device to join the linked capture session; the inviting the additional device comprising providing, by the computing device to the additional device, one or more of a QR code, and a link to join the linked capture session via a social media service; the remote storage system configured to determine a timestamp for images captured by the computing device and for images captured by the additional device, and synchronize the computing device timestamp and the additional device timestamp to create a common timestamp for captured images in the remote storage system; the method further comprising ending the linked capture session; the ending the linked capture session comprising unlinking the computing device and the additional device from the linked capture session such that captured images are not automatically communicated to the remote storage system; the remote storage system configured to filter the communicated captured images by one or more of ranking images based on a contact list, ranking images based on a number of votes received, ranking images based on a number of downloads, and ranking images based on a credential of a photographer.

A computing device comprising: a processor; and a computer-readable storage medium having stored thereon multiple instructions that, when executed by the processor, cause the processor to perform acts comprising: initiating, between the computing device and an additional device, a linked capture session that enables access to a remote storage system, the linked capture session defined by one or more of a time duration, an event, and a group of users; capturing an image; and automatically communicating the captured image to the remote storage system.

Alternatively or in addition to any of the above described computing devices, any one or combination of: the initiating the linked capture session comprising inviting, by the computing device, the additional device to join the linked capture session; the inviting the additional device comprising providing, by the computing device to the additional device, one or more of a QR code associated with the linked capture session, and a link to join the linked capture session via a social media service; the remote storage system configured to determine timestamps for images captured by the computing device and for images captured by the additional device, and synchronize the timestamp for the computing device and the timestamp for the additional device to create a common timestamp for captured images in the remote storage system; the acts further comprising receiving multiple different captured images of selected subject matter from the remote storage system, and combining the multiple different captured images to create a three-dimensional image of the selected subject matter; the remote storage system configured to filter the communicated captured images by one or more of ranking images based on a contact list, ranking images based on a number of votes received, ranking images based on a number of downloads, and ranking images based on a credential of a photographer; the acts further comprising ending the linked capture session by unlinking the computing device and the additional device from the linked capture session such that captured images are not automatically communicated to the remote storage system.

A method implemented in a service that provides access to a linked capture session, the method comprising: receiving, from a computing device that is capable of participating in the linked capture system, a request to initiate the linked capture session, the request including an image of a user associated with the computing device and a definition of the image capture session; receiving, from another computing device that is capable of participating in the linked capture session, an image that includes both a user associated with the other computing device and the user associated with the computing device; connecting the other computing device to the linked capture session; automatically receiving and storing images captured by the computing device and the other computing device during the defined linked capture session; and allowing access, by the computing device and the other computing device, to the stored images.

Alternatively or in addition to any of the above described methods, any one or combination of: the definition of the image capture session comprising at least one of a time duration, an event, a geo-coded boundary, and a proximity between devices capable of participating in the linked capture session; the image comprising a selfie taken by the user associated with the other computing device; the method further comprising ending the linked capture session, the ending the linked capture session comprising unlinking the computing device and the other computing device from the linked capture session such that captured images are not automatically received and stored by the service; the method further comprising determining a timestamp for images captured by the computing device and for images captured by the other computing device, and synchronizing the timestamp of the computing device and the timestamp of the other computing device to create a common timestamp for the stored images; the method further comprising combining multiple different stored images of selected subject matter to create a three-dimensional image of the selected subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
a processor; and
a computer-readable storage medium having stored thereon multiple instructions that, when executed by the processor, cause the processor to perform acts comprising:
receiving, from a first computing device that is capable of participating in a linked capture session, a request to initiate the linked capture session, the request including an image of a user associated with the first computing device and a definition of the linked capture session, wherein the definition of the linked capture session comprises at least one of an event, a geo-coded boundary, or a proximity between the first computing device and a second computing device capable of participating in the linked capture session;
receiving, from the second computing device, an image that includes both a user associated with the second computing device and the user associated with the first computing device;
based on receiving the image that includes both the user associated with the second computing device and the user associated with the first computing device, connecting the second computing device to the linked capture session;
automatically receiving and storing images captured by the first computing device and the second computing device during the defined linked capture session; and
allowing access, by the first computing device and the second computing device, to the stored images.

2. The computing device of claim 1, the connecting the second computing device to the linked capture session comprising inviting, by the first computing device, the second computing device to join the linked capture session.

3. The computing device of claim 2, the inviting the second computing device comprising providing, by the first computing device to the second computing device, one or more of:
a QR code associated with the linked capture session; and
a link to join the linked capture session via a social media service.

4. The computing device of claim 1, the acts further comprising:
determining timestamps for the images captured by the first computing device and for the images captured by the second computing device; and
synchronizing the timestamp for the first computing device and the timestamp for the second computing device to create a common timestamp for captured images.

5. The computing device of claim 4, the acts further comprising:
receiving multiple different captured images of selected subject matter; and
combining the multiple different captured images to create a three-dimensional image of the selected subject matter.

6. The computing device of claim 1, the acts further comprising filtering captured images by one or more of:
ranking images based on a contact list;
ranking images based on a number of votes received;
ranking images based on a number of downloads; and
ranking images based on a credential of a photographer.

7. The computing device of claim 1, the acts further comprising ending the linked capture session by unlinking the first computing device and the second computing device from the linked capture session such that captured images are not automatically communicated to a remote storage system.

8. A method implemented in a service that provides access to a linked capture session, the method comprising:
receiving, from a computing device that is capable of participating in the linked capture session, a request to initiate the linked capture session, the request including an image of a user associated with the computing device and a definition of the linked capture session, wherein the definition of the linked capture session comprises at least one of an event, a geo-coded boundary, or a proximity between the computing device and another computing device capable of participating in the linked capture session;
receiving, from the another computing device that is capable of participating in the linked capture session, an image that includes both a user associated with the another computing device and the user associated with the computing device;
based on receiving the image that includes both the user associated with the another computing device and the user associated with the computing device, connecting the another computing device to the linked capture session;
automatically receiving and storing images captured by the computing device and the another computing device during the defined linked capture session; and
allowing access, by the computing device and the another computing device, to the stored images.

9. The method of claim 8, the image comprising a selfie taken by the user associated with the another computing device.

10. The method of claim 8, further comprising ending the linked capture session, the ending the linked capture session comprising unlinking the computing device and the another computing device from the linked capture session such that captured images are not automatically received and stored by the service.

11. The method of claim 8, further comprising:
determining a timestamp for images captured by the computing device and for images captured by the another computing device; and
synchronizing the timestamp of the computing device and the timestamp of the another computing device to create a common timestamp for the stored images.

12. The method of claim 11, further comprising combining multiple different stored images of selected subject matter to create a three-dimensional image of the selected subject matter.

* * * * *